United States Patent
Sugaya

(10) Patent No.: US 10,447,873 B2
(45) Date of Patent: Oct. 15, 2019

(54) DISPLAY DEVICE FOR DISPLAYING A VARIETY OF DATA ELEMENTS IN A LIST FORM

(71) Applicant: KONICA MINOLTA, INC., Chiyoda-ku, Tokyo (JP)

(72) Inventor: Takashi Sugaya, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/170,212

(22) Filed: Oct. 25, 2018

(65) Prior Publication Data

US 2019/0141205 A1    May 9, 2019

(30) Foreign Application Priority Data

Nov. 9, 2017 (JP) ................................. 2017-216197

(51) Int. Cl.
*H04N 1/00* (2006.01)
*G06F 3/0488* (2013.01)
*G06F 3/0485* (2013.01)

(52) U.S. Cl.
CPC ..... *H04N 1/00419* (2013.01); *H04N 1/00474* (2013.01); *G06F 3/0485* (2013.01); *G06F 3/04883* (2013.01); *H04N 2201/0094* (2013.01)

(58) Field of Classification Search
None
See application file for complete search history.

(56) References Cited

U.S. PATENT DOCUMENTS

| 8,935,620 | B1* | 1/2015 | Cox | G06F 3/0483 |
| | | | | 709/203 |
| 10,126,903 | B2* | 11/2018 | Peng | G06F 3/0481 |
| 2008/0079972 | A1* | 4/2008 | Goodwin | G06F 3/0485 |
| | | | | 358/1.12 |
| 2012/0284662 | A1* | 11/2012 | Kumar | G06F 9/451 |
| | | | | 715/781 |
| 2013/0176256 | A1* | 7/2013 | Hara | G06F 3/0485 |
| | | | | 345/173 |

(Continued)

FOREIGN PATENT DOCUMENTS

| JP | 2005072922 A | 3/2005 |
| JP | 2014074980 A | 4/2014 |
| JP | 2017102773 A | 6/2017 |

*Primary Examiner* — Miya J Williams
(74) *Attorney, Agent, or Firm* — Buchanan Ingersoll & Rooney PC

(57) ABSTRACT

A display device, comprises: a manipulation input part that receives user operation; a display part on which a list screen showing a plurality of data elements in a list form is displayed; and a hardware processor that: obtains the data element to display on the list screen; and creates the list screen based on the obtained data element and displays on the display part. The hardware processor obtains a number of the data element that is more than a number that can be displayed on the list screen and that enables a time required until completion of displaying the list screen to be less than a predetermined period of time and outputs the number of the data element that can be displayed on the list screen, and stores the data element exceeding the number that can be displayed on the list screen as cache.

18 Claims, 18 Drawing Sheets

(56) References Cited

U.S. PATENT DOCUMENTS

| | | | |
|---|---|---|---|
| 2014/0096071 A1* | 4/2014 | Tomita | G06F 3/04883 715/784 |
| 2014/0122994 A1* | 5/2014 | Beckmann | G06F 16/54 715/234 |
| 2015/0020022 A1* | 1/2015 | Murakami | G06F 3/0485 715/784 |
| 2016/0012018 A1* | 1/2016 | Do Ba | H04L 12/6418 715/234 |
| 2016/0291848 A1* | 10/2016 | Hall | G06F 3/04817 |
| 2017/0039170 A1* | 2/2017 | Tunali | G06F 3/0485 |
| 2017/0228120 A1* | 8/2017 | Phillips | G06F 3/0485 |

* cited by examiner

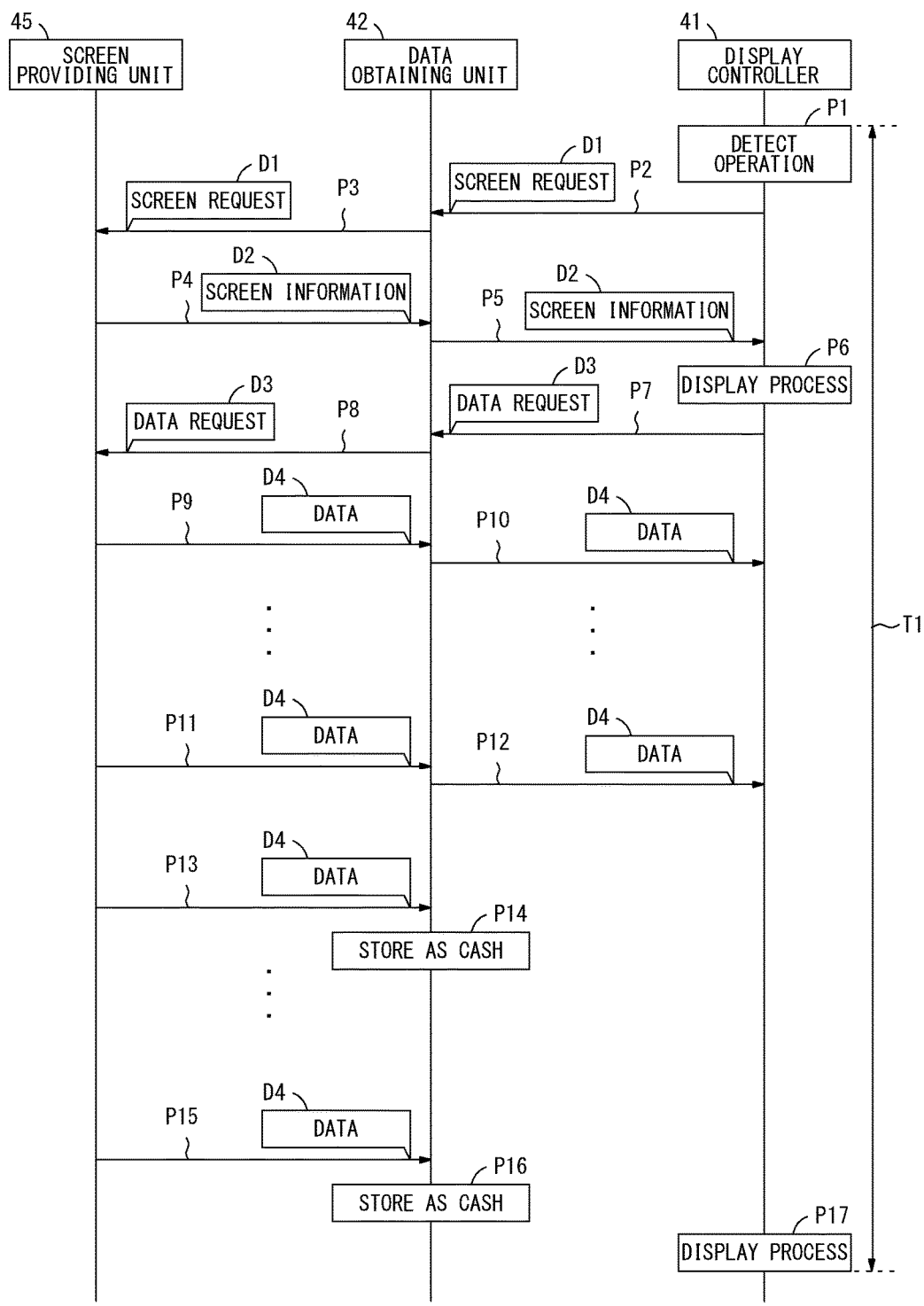

FIG. 6

USER INFORMATION 51

| REGISTRATION NUMBER | | 00249 | 51a |
|---|---|---|---|
| USER NAME | | USER A | 51b |
| PASSWORD | | ******** | 51c |
| TEMPORARY USAGE TERMINATION | | NO TERMINATION | 51d |
| FUNCTIONAL RESTRICTION | COPY OPERATION | ALLOW COLOR/BLACK | 51e |
| | SCAN OPERATION | ALLOW COLOR/BLACK | 51f |
| | PRINTING | ALLOW COLOR/BLACK | 51g |
| | BOX OPERATION | ALLOW | 51h |

FIG. 7

ADDRESS INFORMATION 52

| REGISTRATION NUMBER | 00249 | 52a |
|---|---|---|
| REGISTRATION NAME | USER A | 52b |
| COMPANY NAME | ABC Company | 52c |
| SEARCH WORD | A | 52d |
| FREQUENTLY USED ADDRESS | YES | 52e |
| ADDRESS | userA@******.* | 52f |

FIG. 8

BOX INFORMATION 53

| BOX NUMBER | 0124 | 53a |
|---|---|---|
| BOX NAME | REGULAR MEETING MATERIAL | 53b |
| SEARCH WORD | R | 53c |
| DOCUMENT DELETION SETTING | 3 DAYS LATER | 53d |

DISPLAY DEVICE FOR DISPLAYING A VARIETY OF DATA ELEMENTS IN A LIST FORM

Japanese patent application No. 2017-216197 filed on Nov. 9, 2017 including description, claims, drawings, and abstract the entire disclosure is incorporated herein by reference in its entirety.

BACKGROUND

Technological Field

The present invention relates to a display device, an image processing device, a display system and a non-transitory recording medium. The present invention more specifically relates to a data obtaining technique for displaying a variety of data elements in a list form.

Description of the Related Art

Conventional image processing devices such as MFPs (Multifunction Peripherals) are provided with operational panels which are operable for users. When a scan function is selected by the user, for example, the image processing device reads information of many addresses registered in advance. The image processing device displays the addresses that may be destinations of image data of the information regarding many addresses in a list form, and displays the addresses in the list for as the list screen on the operational panel. The user may select the address on the list screen. The number of the addresses that may be displayed on the list screen is limited. The image processing device scrolls the list screen in response to the user operation so that it may sequentially display many addresses on the list screen.

When the image processing device displays the list screen on the operational panel in response to detecting the operation requesting the display of the list screen performed by the user, for instance, it may read whole address information stored in a device such as a hard disk drive (HDD). In such a case, it may take time until an initial screen of the list screen is displayed on the operational panel. It then takes time until the user is enabled to start the operation to select the desired address displayed on the list screen, resulting in decreased operability.

On the other hand, while the list screen is being displayed on a conventional display device, the operation such as a flick operation to scroll performed by the user may be detected. In such a case, the display device reads ahead a predetermined amount of information that should be displayed next in a scroll direction and stores the looked-ahead information in a memory. This known technique is introduced for example in Japanese Patent Application Laid-Open No. JP 2014-74980 A. According to the known technique, when the user performs the operation such as the flick operation to scroll the list screen, the information in the scroll direction is loaded in advance into the memory. As a result, once the following flick operation is detected, the list screen may be scrolled smoothly.

According to the known technique, however, the aforementioned process is performed when operation such as the flick operation by the user is detected while the list screen has already been displayed on the display device. Thus, the time until the list screen is displayed on the display device at first cannot be shortened.

In order to shorten the time until the list screen is displayed on the display device at first, it is considered to only obtain a predetermined number of data elements which may be fit and displayed in the single screen, for example. To be more specific, if 8 addresses may be displayed in the single screen of the list screen, only the information relating to the 8 addresses may be obtained for displaying the list screen at first. The list screen then is enabled to be displayed rapidly.

Only the information that fit in the single screen may be obtained as described above, and the user may perform the operation such as the flick operation soon after the list screen is displayed. In such a case, the list screen cannot be scrolled smoothly, and the user may feel something is off. This causes an occurrence of a new problem.

SUMMARY

The present invention is intended to solve the above problems. Thus, the present invention is intended to provide a display device, an image processing device, a display system and a non-transitory recording medium capable of displaying a list screen without making a user feel off in operation.

First, the present invention is directed to a display device.

To achieve at least one of the abovementioned objects, according to an aspect of the present invention, the display device reflecting one aspect of the present invention comprises: a manipulation input part that receives user operation; a display part on which a list screen showing a plurality of data elements in a list form is displayed; and a hardware processor that: obtains the data element to display on the list screen; and creates the list screen based on the obtained data element and displays on the display part. The hardware processor obtains a number of the data element that is more than a number that can be displayed on the list screen and that enables a time required until completion of displaying the list screen to be less than a predetermined period of time and outputs the number of the data element that can be displayed on the list screen, and stores the data element exceeding the number that can be displayed on the list screen as cache when the list screen is displayed on the display part in response to the user operation received by the manipulation input part.

Second, the present invention is directed to an image processing device.

To achieve at least one of the abovementioned objects, according to an aspect of the present invention, the image processing device reflecting one aspect of the present invention comprises a display device according to claim 1.

Third, the present invention is directed to a display system.

To achieve at least one of the abovementioned objects, according to an aspect of the present invention, the display system reflecting one aspect of the present invention comprises: a display device according to claim 1; and a server that provides the display device with a data element to display a list screen in response to a request from the display device.

Fourth, the present invention is directed to a non-transitory recording medium storing a computer readable program to be executed by a hardware processor in a display device that includes a manipulation input part that receives user operation; and a display part on which a list screen showing a plurality of data elements in a list form is displayed.

To achieve at least one of the abovementioned objects, according to an aspect of the present invention, the non-transitory recording medium reflecting one aspect of the present invention stores the computer readable program, execution of the computer readable program by the hardware processor in the display device causing the hardware processor to perform: obtains the data element to display on the list screen; and creates the list screen based on the obtained data element and displays on the display part. A number of the data element that is more than a number that can be displayed on the list screen and that enables a time required until completion of displaying the list screen to be less than a predetermined period of time is obtained and the number of the data element that can be displayed on the list screen is output, and the data element exceeding the number that can be displayed on the list screen is stored as cache when the list screen is displayed on the display part in response to the user operation received by the manipulation input part.

BRIEF DESCRIPTION OF THE DRAWING

The advantages and features provided by one or more embodiments of the invention will become more fully understood from the detailed description given herein below and the appended drawings which are given by way of illustration only, and thus are not intended as a definition of the limits of the present invention.

FIG. 4 is a flow diagram showing an exemplary operation performed for displaying a list screen on the display unit;

FIG. 6 illustrates an example of user information;

FIG. 7 illustrates an example of address information;

FIG. 8 illustrates an example of box information;

DETAILED DESCRIPTION OF EMBODIMENTS

Hereinafter, one or more embodiments of the present invention will be described with reference to the drawings. However, the scope of the invention is not limited to the disclosed embodiments.

First Preferred Embodiment

Figure 1:
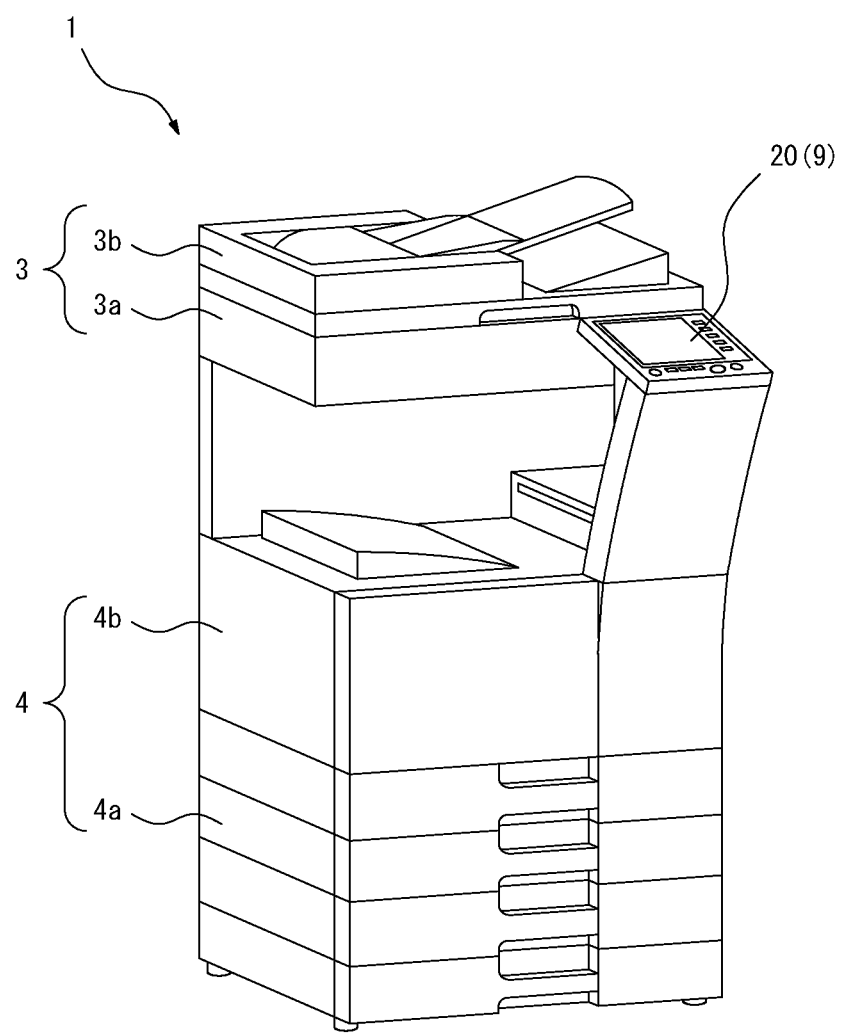
FIG. 1 illustrates an exemplary appearance structure of an image processing device.

FIG. 1 illustrates an exemplary appearance structure of an image processing device 1 in which the first preferred embodiment of the present invention may be practiced. The image processing device 1 may be one of MFPs including multiple functions such as a scan function, a print function and/or a fax function, for instance. The image processing device 1 includes a scanner section 3 in an upper part of the device body, and a printer section 4 in a lower part of the device body. The image processing device 1 is provided with an operational panel 20 operable for a user on a front side of the scanner section 3.

The scanner section 3 becomes operative to process a scan job when the scan function is selected by the user. The scanner section 3 includes an image reader 3a and an automatic document carrier 3b. The scanner section 3 feeds a document one after another placed by the user, and optically reads an image of the document when the document passes through a predetermined position. The scanner section 3 may be a device without the automatic document carrier 3b.

The printer section 4 becomes operative in response to receiving a print job over a network, for instance. The printer section 4 also becomes operative when the print function is selected by the user and an instruction to produce a printed output based on data such as document data stored in the image processing device 1 is given. The printer section 4 includes a paper feeder 4a and an image forming unit 4b, for example. The printer section 4 feeds a printing medium such as a printing sheet placed in advance in the paper feeder 4a, and transfers a toner image on the printing medium when the printing medium passes through a predetermined position. The printer section 4 then fixes the toner image on the printing medium and produces the printed output.

The operational panel 20 is a user interface for the user to use the image processing device 1. The operational panel 20 is one of a display device 9 of the present invention.

Figure 2:
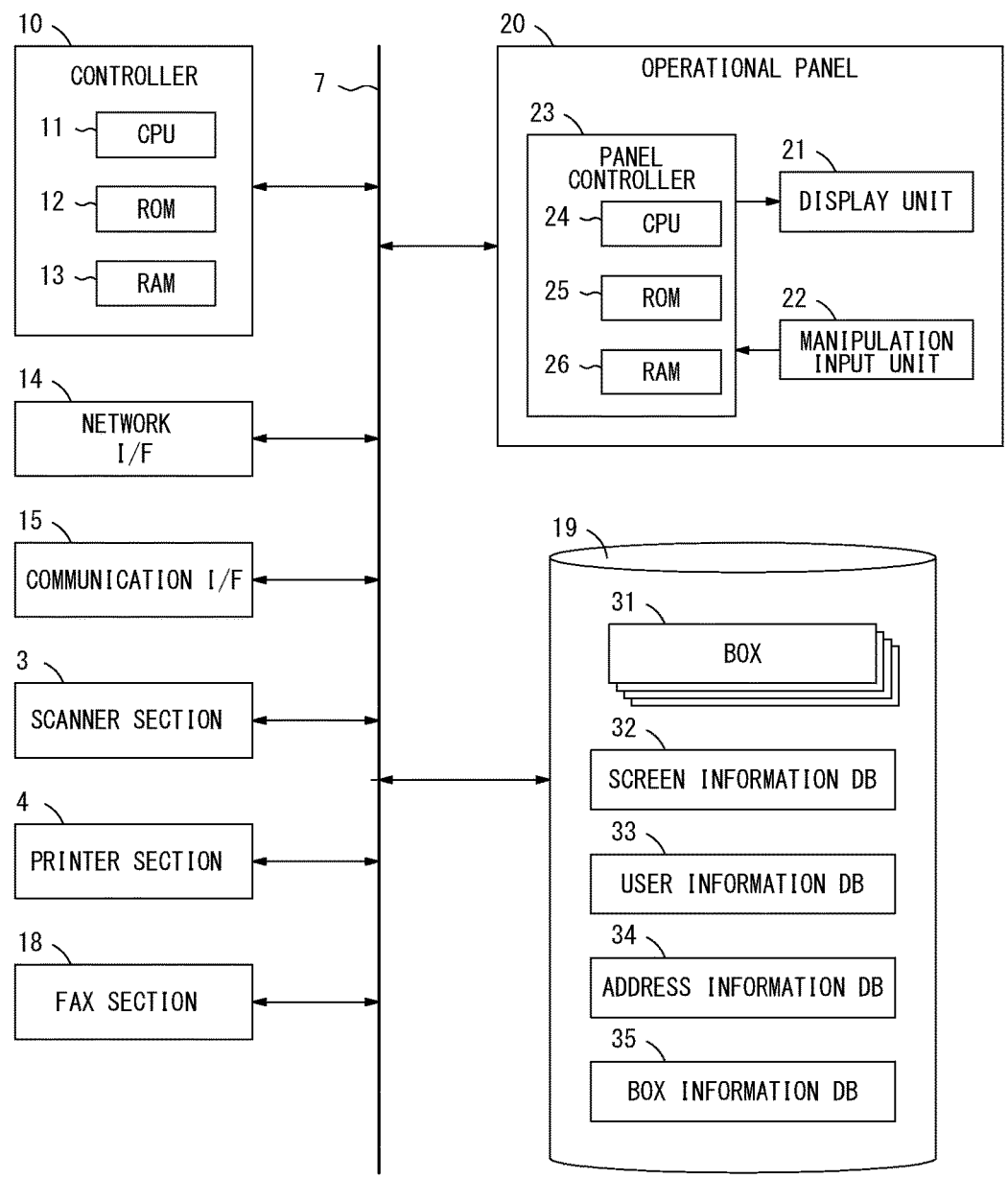
FIG. 2 illustrates a block diagram showing an example of a hardware structure of the image processing device.

FIG. 2 illustrates a block diagram showing an example of the hardware structure of the image processing device 1. As its hardware structure, the image processing device 1 includes a controller 10, a network interface 14, a communication interface 15, a fax section 18 and a storage 19 besides the scanner section 3, the printer section 4 and the operational panel 20 as described earlier. Each hardware is enabled to input and output data to and from each other via a data bus 7.

The controller 10 includes a CPU 11, a ROM 12 and a RAM 13. Once the image processing device 1 is powered, the CPU 11 reads and executes a program stored in advance in the ROM 12. As a result, the controller 10 performs various types of processes, and controls overall operations of each part of the image processing device 1. Temporal data generated in response to execution of the program by the CPU 11 is stored in the RAM 13.

The network interface 14 connects the image processing device 1 to the network such as a LAN (Local Area Network). The image processing device 1 is enabled to send image data to outside or receive the image data from outside via the network interface 14.

The communication interface 15 is to perform wireless communication with an external terminal such as a portable terminal like a smartphone or a tablet terminal, for instance. The image processing device 1 is capable of communicating with the external terminal via the communication interface 15.

The fax section 18 transmits and receives fax data over public phone lines, which are not shown in FIG. 2.

The operational panel 20 includes a display unit 21, a manipulation input unit 22 and a panel controller 23. The display unit 21 is constructed by a device such as a color liquid crystal display, for instance. A variety of screens operable for the user may be displayed on the display unit 21. The manipulation unit 22 may include touch panel keys arranged on the display area of the display unit 21 and/or push-button keys arranged around the display area of the display unit 21. The touch panel key, for example, not only detects touch operation performed by the user to the display screen but also moving direction or moving rate of the touched position when the user moves the touched position with continuing the touch operation. The touch panel key is also capable of detecting scroll operation and/or flick operation performed by the user. In the below descriptions, the scroll operation and/or flick operation is collectively called "flick operation."

The panel controller 23 includes a CPU 24, a ROM 25 and a RAM 26. The CPU 24 reads and executes a program stored in advance in the ROM 25 to control the screen displayed on the display unit 21 or to detect the user operation performed to the manipulation unit 22. The RAM 26 is a temporal storage to store temporal data therein. The RAM 26 is used as a cache memory in which data to display a list screen as described later is stored, for instance.

The storage 19 is formed from a non-volatility storage device such as a hard disk drive (HDD), for example. The storage 19 includes a box 31 which is a storage area to store document data and/or the image data therein. The box 31 is allocated to an individual user or a group. The storage 19 may include multiple boxes 31.

A screen information database (hereafter "screen information DB") 32, a user information database (hereafter "user information DB") 33, an address information database (hereafter, "address information DB") 34 and a box information database (hereafter "box information DB") are stored in the storage 19.

The screen information DB 32 is a group of data as which the screen information to display on the display unit 21 of the operational panel 20 is stored. A variety of information is stored in advance for each screen to display on the display unit 21 in the screen information DB 32. There is the operation screen on which the user operable operation key is arranged, for example. In such a case, the screen information stored in the screen information DB 32 would be the image information which arranges the icon image of the operation key, for instance, in a predetermined position on the screen. There is the list screen on which multiple numbers of the data elements are displayed in the list form, for example. In such a case, the screen information stored in the screen information DB 32 would be the image information which states a screen frame displayed in the outer circumference of the list display area, and the inner side of the list display area to be blank. Multiple amount of this type of the screen information is stored in the screen information DB 32.

The user information DB 33 is a group of data as which the user information relating to the user who uses the image processing device 1 is stored. The image processing device 1 is shared and used by multiple users. The user information relating to the individual user is registered in advance with the user information DB 33.

The address information DB 34 is a group of data as which the address information relating to the address to which the data is sent from the image processing device 1 is stored. The types of the address registered with the address information DB 34 are classified into, for instance, email, box and fax. Information relating to an email address, information for identifying the box 31 and/or information relating to a fax number is registered in advance as the address information with the address information DB 34.

The box information DB 35 is a group of data as which box information relating to the box 31 created in the storage 19 is stored. Information such as a box number and/or a box name is registered in advance as the box information for each box with the box information DB 35, for example.

Figure 3:
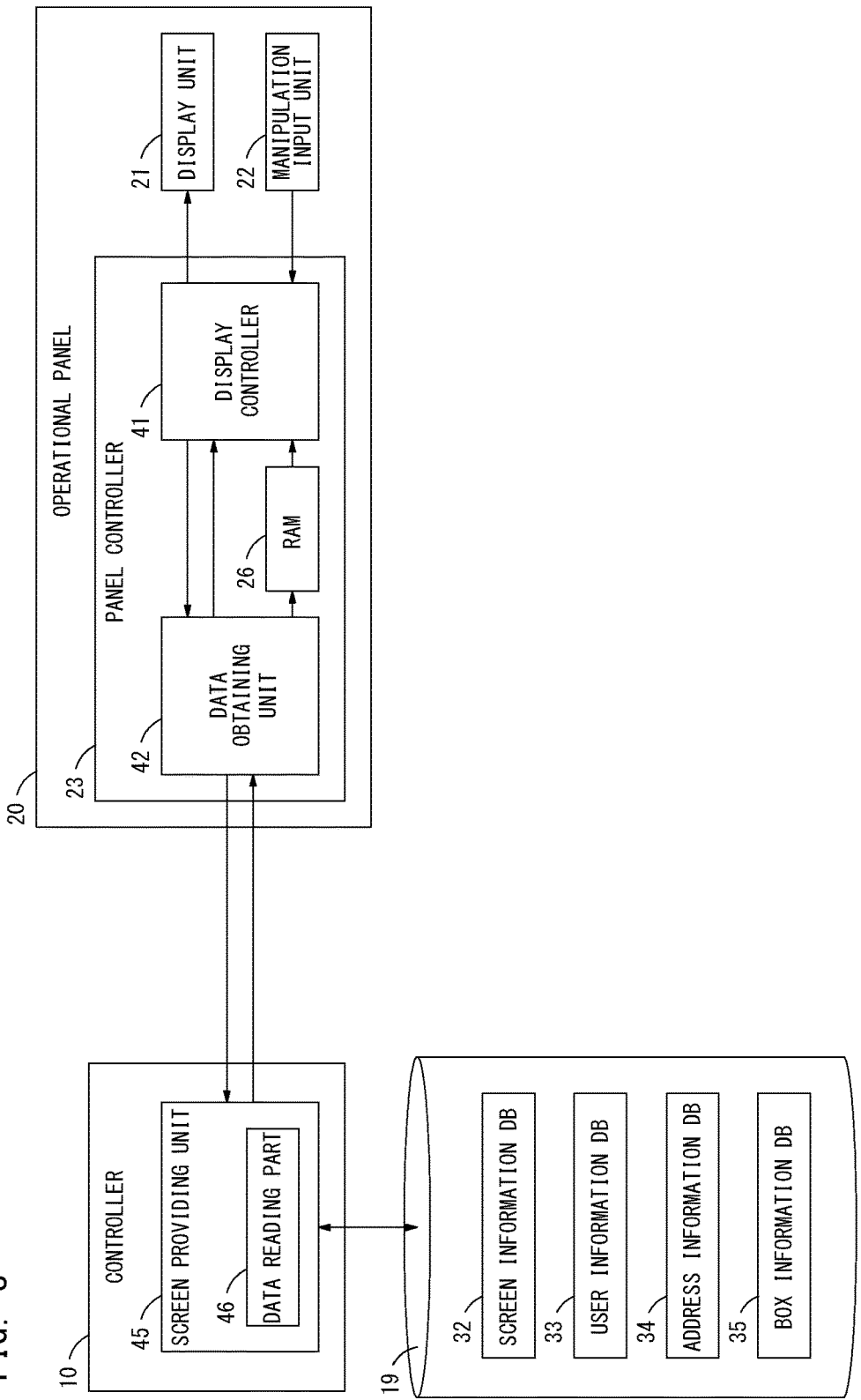
FIG. 3 illustrates a block diagram showing an example of a functional structure to display a variety of screens on a display unit.

FIG. 3 illustrates a block diagram showing an example of the functional structure to display the variety of screens on the display unit 21. As illustrated in FIG. 3, the CPU 24 executes the program so that the panel controller 23 serves as a display controller 41 and a data obtaining unit 42. The CPU 11 executes the program so that the controller 10 serves as a screen providing unit 45. Moreover, the screen providing unit 45 serves as a data reading part 46 that accesses the storage 19 and reads the data stored in the storage 19.

The display controller 41 outputs the data for display to the display unit 21 so that it enables the variety of screens to be displayed on the display unit 21. The display controller 41 detects the operation performed by the user to the manipulation input unit 22, and updates the screen to display on the display unit 21. For displaying the variety of screens on the display unit 21, the display controller 41 outputs a screen request to the data obtaining unit 42.

The data obtaining unit 42 becomes operative when the screen request is received from the display controller 41. The data obtaining unit 42 obtains the screen information and/or the data from the screen providing unit 45 based on the screen request from the display controller 41, and outputs the obtained screen information and/or data to the display controller 41. Thus, the display controller 41 may update the display screen of the display unit 21.

In response to the request from the data obtaining unit 42, the screen providing unit 45 brings the data reading part 46 into operation. The data reading part 46 reads the screen information in the screen information DB 32 based on the request from the data obtaining unit 42. After the screen information is obtained by the data reading part 46, the screen providing unit 45 outputs the screen information to the data obtaining unit 42.

The screen displayed on the display unit 21 may not be the list screen and may be the operation screen that only includes icon images such as the operation keys arranged on the screen. In such a case, the display controller 41 only requests the data obtaining unit 42 for the screen information. The data obtaining unit 42 then obtains the screen information corresponding to the operation screen to display on the display unit 21, and outputs the obtained screen information to the display controller 41. After the screen information is obtained by the data obtaining unit 42, the display controller 41 is enabled to display the operation screen on the display unit 21 rapidly.

Contrary, the screen to be displayed on the display unit 21 may be the list screen such as an address list. In such a case, the display controller 41 requests the data obtaining unit 42 for the screen information that states the screen frame showing the outer circumference of the list display area and the data to display the list in the list display area. Then, the data obtaining unit 42 requests the screen providing unit 45 for the screen information that states the screen frame showing the outer circumference of the list display area and the data to display the list in the list display area.

The number of the data element which is more than the number that may be displayed in the list display area (list screen), and less than the number that enables the time until completion of displaying the list screen to be less than a predetermined period of time Ta is obtained by the data obtaining unit 42. The data obtaining unit 42 outputs the number of the data element equal to the number that may be displayed on the list screen to the display controller 41, and stores the data which excess the number that may be displayed on the list screen, for instance, in the RAM 26 as cache. If the number of the data element that may be displayed on the list screen is 8, the data obtaining unit 42 obtains the number of the data element more than 8 and the number falls within the number that enables the time until completion of displaying the list screen to be less than the predetermined period of time Ta from the screen providing unit 45.

The predetermined period of time Ta compared with the time required until completion of displaying the list screen may be designated by an administrator or the user of the image processing device 1 appropriately. It is assumed, for example, the time until the list screen is displayed at first after the user performs the operation to display the list screen to the operational panel 20 is less than 550 ms. If so, the user does not feel something is off, and it does not cause the decrease in the operability. 550 ms, therefore, is designated as the predetermined period of time Ta.

If a time required for the display controller 41 to perform a display process to display the list screen is Tb, a time Tth that may be taken by the data obtaining unit 42 to obtain the data element to display the list screen is Tth≤Ta−Tb. The predetermined period of time Ta may be 550 ms, and the time Tb required for the display process may be 400 ms, for instance. The time Tth for the data obtaining unit 42 to obtain the data element is Tth≤150 ms. To be more specific, the data obtaining part 42 repeatedly obtains the data element from the screen providing unit 45 not exceeding 150 ms so that it may obtain the number of the data element that enables the time required for completion of displaying the list screen to be fallen within the time less than the predetermined time Ta from the screen providing unit 45.

Figure 5A:
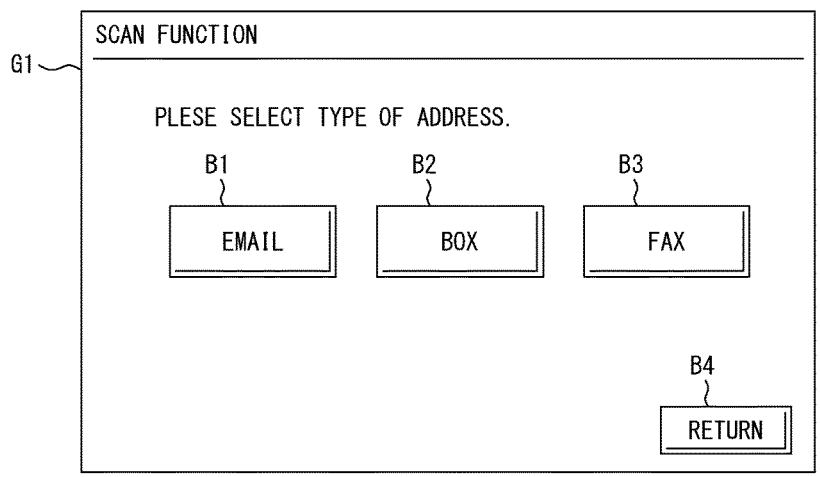
FIGS. 5A, 5B and 5C illustrate a screen transition on the display unit.
Figure 5B:
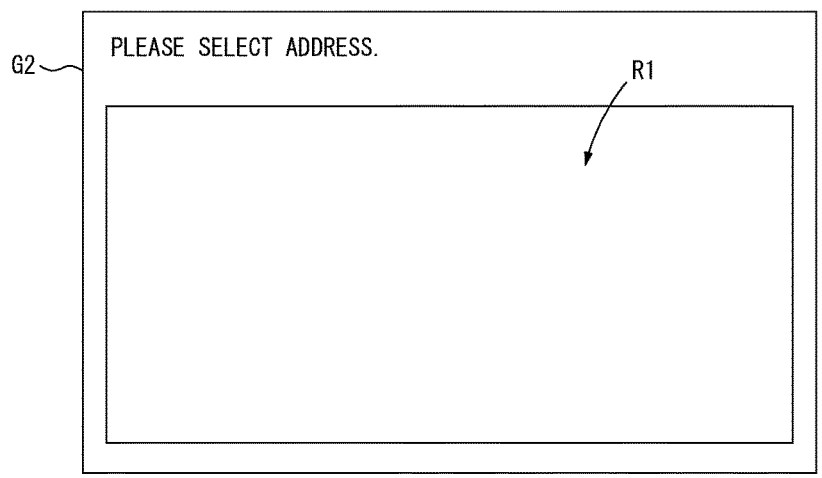
Figure 5C:
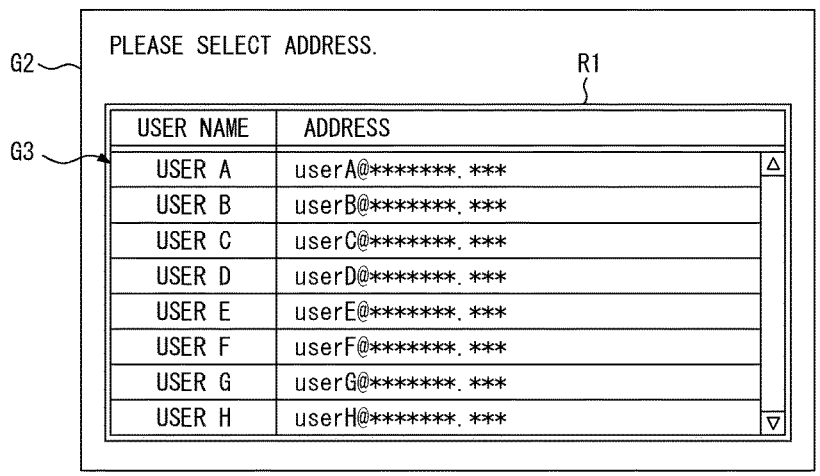

FIG. 4 is a flow diagram showing an exemplary operation performed for displaying the list screen on the display unit 21. FIGS. 5A, 5B and 5C illustrate a screen transition on the display unit 21. As illustrated in FIG. 5A, an operation screen G1 to select the type of the address is displayed on the display unit 21 at first when the user selects the scan function. On the operation screen G1, operation keys B1 to B4 to select the type of the address are displayed. The operation key B1 is to select the email address, the operation key B2 is to select the box 31, the operation key B3 is to select fax and the operation key B4 is to return to the previous screen. The user operates one of the operation keys B1 to B3 on the operation screen G1, and the display controller 41 detects the operation as the operation to display the list screen.

As illustrated in FIG. 4, in response to detecting the operation to display the list screen performed by the user (process P1), the display controller 41 outputs a screen request D1 to the data obtaining unit 42 (process P2). After receiving the screen request D1 from the display controller 41, the data obtaining unit 42 outputs the screen request D1 to the screen providing unit 45 (process P3), and obtains screen information D2 from the screen providing unit 45 (process P4). The screen information D2 is to display on the display unit 21 and is to display the screen frame as illustrated in FIG. 5B, for example. After obtaining the screen information D2, the data obtaining unit 42 outputs the screen information D2 to the display controller 41 (process P5). The display controller 41 then performs the display process to display the screen based on the screen information D2 on the display unit 21 (process P6). As a result, a screen G2 as illustrated in FIG. 5B is displayed on the display unit 21. More specifically, the screen G2 has a screen structure including a list display area R1 in a predetermined position in the center of the screen G2. At this stage, the data element to display on a list screen G3 has not been obtained yet. The screen G2 is displayed with the blank list display area R1.

The display controller 41 sends a data request D3 to the data obtaining unit 42 (process P7). The data request D3 is to request the data element to display on the list screen G3. After receiving the data request D3 from the display controller 41, the data obtaining unit 42 outputs the received data request D3 to the screen providing unit 45 (process P8). In response to the data request D3 from the data obtaining unit 42, the screen providing unit 45 reads the data element relating to one of the addresses from the address information registered with the address information DB 34 in the storage 19. The data registered with the address information DB 34, for instance, is sequentially read from the top data by the screen providing unit 45. The screen providing unit 45 sends a data element D4 read from the address information DB 34 to the data obtaining unit 42 (process P9). Once receiving the data element D4 from the screen providing unit 45, the data obtaining unit 42 outputs the received data element D4 to the display controller 41 (process P10). Thus, the display controller 41 is enabled to obtain the first data element to display on the list screen G3.

After this process, the similar process is repeatedly performed so that the data obtaining unit 42 sequentially obtains the second data element, the third data element, etc. to display on the list screen G3. More specifically, the data obtaining unit 42 sends the data request D3 to the screen providing unit 45, and repeatedly performs the process to obtain the data element from the screen obtaining unit 45. The data obtaining unit 42 obtains the last data element D4 of the number of the data elements which may be displayed on the list screen G3 from the screen providing unit 45 (process P11). The data obtaining unit 42 then outputs the last data element D4 to the display controller 41 (process P12). As a result, the data element corresponding to the single screen of the list screen G3 is output to the display controller 41.

Even after sending the single screen of the data element to the display controller 41, the data obtaining unit 42 further repeatedly obtains the data element D4 within the time that enables the time until completion of displaying the list screen to be less than the predetermined period of time Ta. To be more specific, even after sending the single screen of the data element to the display controller 41, the data obtaining unit 42 sends the data request D3 to the screen providing unit 45, and repeatedly performs the process to obtain the data element D4 succeeding the single screen of the data element from the screen providing unit 45 (process P13). The data obtaining unit 42 stores the data element D4 obtained from the screen providing unit 45 after sending the single screen of the data element to the display controller 41 in the RAM 26 as cache (process P14).

The data obtaining unit 42 obtains the last data element D4 which may be obtained at last within the time which enables the time required until completion of displaying the list screen to be less than the predetermined period of time Ta from the screen providing unit 45 (process P15), and stores the last data element D4 in the RAM 26 as cache (process P16). The data obtaining unit 42 then does not perform the data obtaining process after this, and enables the display controller 41 to perform the display process. More specifically, the CPU 24 may be occupied for the display process (process P17) by the display controller 41. The display controller 41 creates the list screen G3 based on the single screen of the data element that has already been obtained, and displays the list screen G3 in the list display area R1. As a result, the display screen on the display unit 21 is transited from the screen G2 of FIG. 5B to the screen G2 of FIG. 5C. To be more specific, the list screen G3 is displayed in the list display area R1 in the screen G2 as illustrated in FIG. 5C.

As described above, according to the first preferred embodiment, the time TI from detecting the operation to display the list screen (process P1) to completing the display process (process P17) of the list screen G3 is less than the predetermined period of time Ta as illustrated in FIG. 4. It, therefore, does not bother the user about the time TI until the list screen G3 is displayed on the display unit 21 after performing the operation to display the list screen, and the user is enabled to start the operation to select the data element on his or her choice on the list screen G3 immediately.

As illustrated in FIG. 5C, when the list screen G3 is displayed in the screen G2, the data that did not fallen into the single screen is stored in the RAM 26 as cache. When detecting the flick operation performed by the user while the list screen G3 is being displayed on the display unit 21, the display controller 41 reads the data stored in the RAM 26 and updates the list screen G3. If the flick operation to scroll the list screen G3 is performed by the user after displaying the list screen G3, the display controller 41 is then enabled to scroll display the list screen G3 smoothly.

In the earlier descriptions, the list screen G3 that displays the multiple addresses in the list form is given as an example. The list screen G3 that may be displayed on the display unit 21 does not have to be the list screen of the address. The multiple users registered with the user information DB 33 may be displayed in the list form. Moreover, the multiple boxes 31 registered with the box information DB 35 may be displayed in the list form. More specifically, the data obtaining unit 42 selects the group of the data elements to display on the list screen G3 from among the multiple groups of the data elements, and obtains the data element to display on the list screen G3 one after another from the group of the data element thereby selected. Each of the user information registered with the user information DB 33, the address information registered with the address information DB 34, and the box information registered with the box information DB 35 has different number of items included in the single group of the data elements, and has the different data amount.

FIG. 6 illustrates an example of user information 51 registered with the user information DB 33. As illustrated in FIG. 6, the user information 51 includes 8 items, 51a to 51h The 8 items are the registration number 51a, the user name 51b, the password 51c, the temporary usage termination 51d, the functional restriction as to copy operation 51e, the functional restriction as to scan operation 51f, the functional restriction as to print output 51g and the functional restriction as to box operation 51h. If the data obtaining unit 42 tries to obtain the user information 51 corresponding to the single data element, the data element corresponding to all of the 8 items of FIG. 6 may be obtained.

FIG. 7 illustrates an example of address information 52 registered with the address information DB 34. As illustrated in FIG. 7, the address information 52 includes 6 items 52a to 52f. The 6 items are the registration number 52a, the registration name 52b, the company name 52c, the search word 52d, the item stating whether the address is often used 52e and the address 52f. If the data obtaining unit 42 tries to obtain the address information 52 corresponding to the single data element, the data element corresponding to all of the 6 items of FIG. 7 may be obtained.

FIG. 8 illustrates an example of box information 53 registered with the box information DB 35. As illustrated in FIG. 8, the box information 53 includes 4 items, 53a to 53d. The 4 items are the box number 53a, the box name 53b, the search word 53c and the document deletion setting 53d. If the data obtaining unit 42 tries to obtain the box information 53 corresponding to the single data element, the data element corresponding to all of the 4 items of FIG. 8 may be obtained.

For obtaining the data element from the screen providing unit 45, the time required for the data obtaining unit 42 to obtain the single data element may differ depending on what information, the user information 51, the address information 52 or the box information is to be obtained since each of the information has the different amount of the data element. The data obtaining unit 42, therefore, analyzes the screen request D1 in response to receiving the screen request D1 from the display controller 41, and specifies the data should be displayed on the list screen G3 (the data to be obtained from the screen providing unit 45) is what information from among the user information 51, the address information 52 and the box information 53. The data obtaining unit 42 then designates the number of times to request the screen providing unit 45 for the data element in accordance with the specified number of the items included in the data element.

It is assumed, for example, the time Tth that may be taken by the data obtaining unit 42 to obtain the data element to display on the list screen is 150 ms, and the time required to obtain the data element including the 6 items like the address information 52 may be 10 ms. In such a case, the data obtaining unit 42 designates 15 times as the number of requesting the screen providing unit 45 for the data. On the other hand, for obtaining the data element including the 8 items like the user information 51, the time required for obtaining the data takes longer in response to the increase in the number of the items. Thus, the data obtaining unit 42 designates the less number of the times to request for the data element compared to the case where the data element including the 6 items are to be obtained, and designates, for instance, 11 times (≈6×15/8). For obtaining the data element including the 4 items like the box information 53, the time required for obtaining the data element gets shorter in response to the decrease in the number of the items. Thus, the data obtaining unit 42 designates the more number of the times to request the data element compared to the case where the data element including the 6 items are to be obtained, and designates, for instance, 22 times (≈6×15/4).

The data obtaining unit 42 adjusts the number of the times requesting the screen providing unit 45 for the data based on the amount of the data element obtained from the screen providing unit 45. The time required until the display of the list screen is complete may be suppressed to be less than the predetermined period of time Ta. Also, the data element as many as possible may be obtained in advance, and stored in the RAM 26 as cache. As a result, the data obtaining unit 42 is enabled to immediately respond to the flick operation performed by the user after the list screen G3 is displayed on the display unit 21.

Figure 9:
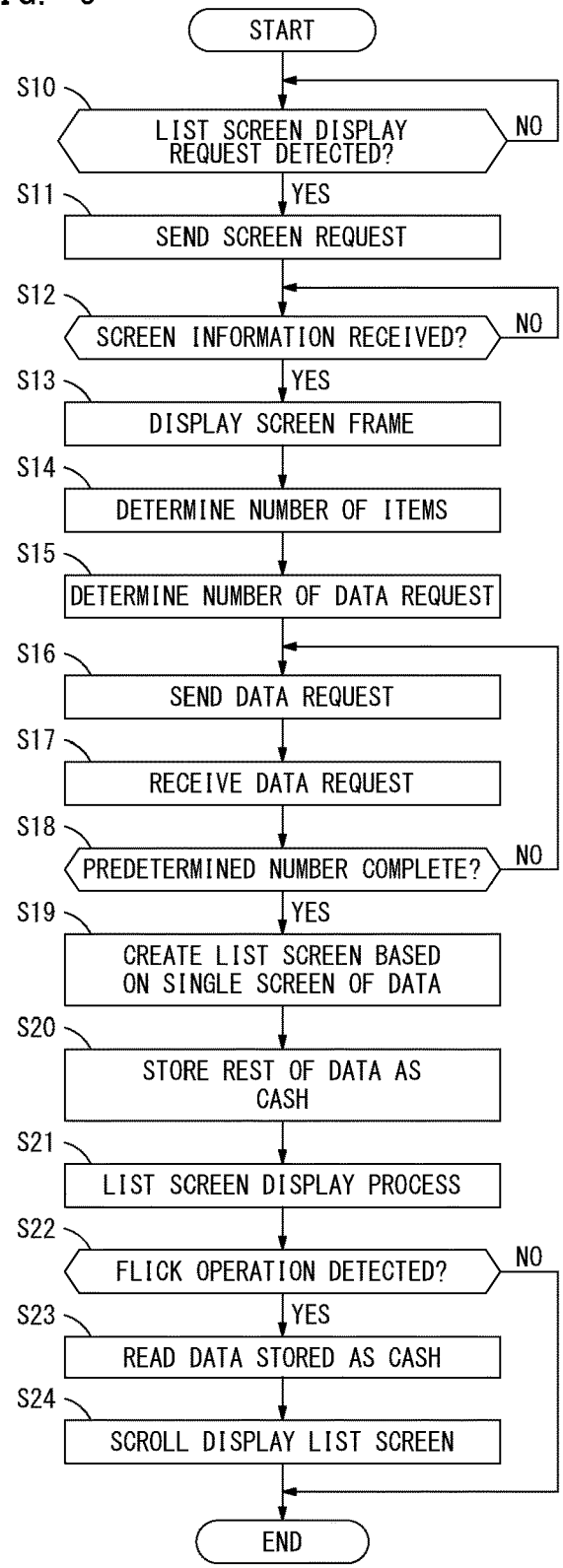
FIG. 9 illustrates a flow diagram explaining an exemplary procedure of a process performed by a panel controller.

A process sequence performed by the panel controller 23 is explained next. FIG. 9 illustrates a flow diagram explaining an exemplary procedure of a process performed by the panel controller 23 of the first preferred embodiment. This process is performed when the CPU 24 reads and executes the program stored in the ROM 25, and performed when the above-described display controller 41 and data obtaining unit 42 become operative. Upon the start of the process, the panel controller 23 determines if a list screen display request is detected (step S10). More specifically, the panel controller 23 determines if the operation performed by the user is to display the list screen G3. In response to detecting the list screen display request (when a result of step S10 is YES), the panel controller 23 sends the screen request D1 to the screen providing unit 45 (step S11). The panel controller 23 then waits until receiving the screen information D2 (step S12). In response to the screen information D2 (when a result of step S12 is YES), the panel controller 23 displays the screen frame to display the list screen G3 based on the screen information D2 (step S13).

The panel controller 23 determines the number of the items included in the data element obtained to display the list screen G3 (step S14), and designates the number of times to request the screen providing unit 45 for the data element based on the number of the items (step S15). The panel controller 23 designates the maximum number of times to request for the data element that enables the time until completion of displaying the list screen G3 to be less than the predetermined period of time Ta.

The panel controller 23 then sends the data request D3 to the screen providing unit 45 (step S16), and receives the data element D4 from the screen providing unit 45 (step S17). In response to obtaining the data element D4 from the screen providing unit 45, the panel controller 23 determines if the number of the times to request for the data element designated in step S15 is complete (step S18). When the number of the times to request for data element is not complete (when a result of step S18 is NO), the panel controller 23 returns to the process in step S16 to repeatedly perform the process to obtain the data element D4 from the screen providing unit 45. When the number of the times to request for the data element designated in step S15 is complete (when a result of step S18 is YES), the panel controller 23 creates the list screen G3 based on the single screen of the data element D4 to display in the list display area R1 (step S19). The remaining data element D4 exceeding the single screen of the data element is stored in the RAM 26 as cache (step S20). The process in step S20 may be performed every time the data element D4 is received in step S17.

The panel controller 23 performs a list screen display process to display the list screen G3 created in step S19 in the list display area R1 (step S21). Through the list screen display process, the list screen G3 on which the plurality of data elements D4 are displayed in the list form. The user is enabled to select the data element on his or her choice from among the plurality of data elements D4 included in the list screen G3. If the data element that the user would like to select is not included in the list screen G3, the user performs the flick operation, for instance, to the list screen G3 to update the data element D4 displayed on the list screen G3.

After displaying the list screen G3, the panel controller 23 determines if the flick operation performed by the user is detected (step S22). The flick operation may not be detected (when a result of step S22 is NO). In this case, the update of the list screen G3 is not necessary, and the process is complete. The flick operation may be detected (when a result of step S22 is YES). In this case, the panel controller 23 reads the data element D4 stored in the RAM 26 as cache (step S23). The panel controller 23 scroll displays the data element D4 to be displayed on the list screen G3 using the data element D4 read from the RAM 26 (step S24).

Figure 10:
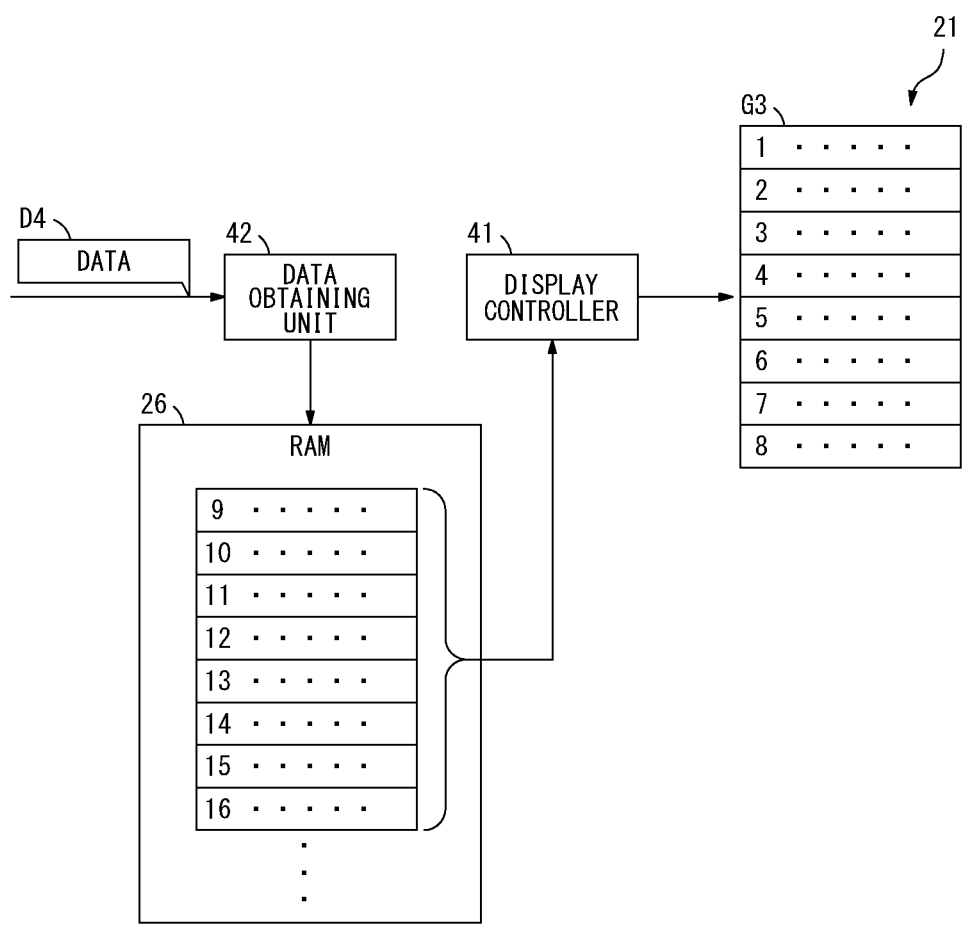
FIG. 10 illustrates a concept of a process for scroll displaying the list screen.

FIG. 10 illustrates a concept of the process for scroll displaying the list screen G3. As illustrated in FIG. 10, when the list screen G3 on which the 8 data elements may be displayed is displayed on the display unit 21, the 9th data element or newer not displayed on the list screen G3 is stored in the RAM 26. If the flick operation by the user is detected and the list screen G3 is to be scrolled, the display controller 41 reads the 9th data element or newer stored in advance in the RAM 26 by the data obtaining unit 42. The display controller 41 may perform high-speed reading rather than obtaining data element from the screen providing unit 45, and enable the list screen G3 to be scrolled quickly.

When the display controller 41 reads the data element in the RAM 26, the data obtaining unit 42 newly obtains the data element D4 from the screen providing unit 45, and stores the obtained data element D4 in the RAM 26 as cache. It is preferable that the process for the data obtaining unit 42 to obtain the data element D4 from the screen providing unit 45 does not cause an extreme delay of the display process for the display controller 41 to scroll the list screen G3. It is assumed, for example, as the list screen G3 has already been displayed on the display unit 21, the list screen G3 being displayed on the display unit 21 is updated based on the flick operation performed by the user. In such a case, the data obtaining unit 42 repeatedly obtains the number of the data element less than the number of the data element that may be displayed on the list screen G3. To be more specific, the less number of the data element obtained from the screen providing unit 45 through the single obtaining process is designated so that the data element may be obtained efficiently. It does not interrupt the display process for the display controller 41 to scroll the list screen G3, and the data element D4 for the following flick operation may be stored in the RAM 26.

The operations performed by the user to update the list screen G3 include an operation to display the next page, for example, besides the flick operation. The operation to display the next page is to replace the whole data elements displayed on the list screen G3 to a set of data elements in the next order, and display the new set of data elements. The operation to display the next page is performed by the user as the list screen G3 has already been displayed on the display unit 21, and the list screen G3 being displayed on the display unit 21 may be updated collectively. In such a case, the data obtaining unit 42 obtains the number of the data element the same as the number that may be displayed on the list screen G3 is obtained from the screen providing unit 45, and stores in the RAM 26. Even when the user repeatedly performs the operation to display the next page for several times, the data element D4 that should be displayed next may be stored in advance in the RAM 26.

As described above, the operational panel 20 of the first preferred embodiment serves as the display device 9 includes the data obtaining unit 42 that obtains the data element to display on the list screen G3. When the list screen G3 is displayed on the display unit 21 based on the user operation received by the manipulation input unit 22, the data obtaining unit 42 obtains the number of the data element more than the number that may be displayed on the list screen G3 and that enables the time until completion of displaying the list screen G3 to be less than the predetermined period of time Ta. The data obtaining unit 42 outputs the number of the data element that may be displayed on the list screen G3 to the display controller 41, and stores the data element exceeding the number that may be displayed on the list screen G3 in the RAM 26 as cache. Thus, the delay in the time until completion of displaying the list screen G3 is not caused, and the data element to be scroll displayed on list screen G3 is obtained in advance and stored in the RAM 26 in preparation for the flick operation by the user after displaying the list screen G3.

When the operation to scroll the list screen G3 performed by the user is detected as the list screen G2 is being displayed on the display unit 21, the display controller 41 obtains the data element stored in the RAM 26 as cache by the data obtaining unit 42 and updates the list screen G3. The list screen G3 may be scroll displayed soon after the user operation is detected. This does not make the user feel off, and enables the smooth scroll display.

In the above descriptions, the case where the data obtaining unit 42 obtains the data element from the screen providing unit 45 one after another is explained. However, this is given not for limitation. Each data unit which is a unit of the plurality of the data elements (for instance, four data elements) may be obtained, or each screen block which is a unit of the screen of the data elements may be obtained. To be more specific, the data obtaining unit 42 may obtain the data element to display on the list screen G3 in a predetermined number.

In the above descriptions, the case where the controller 10 mainly serves as the screen providing unit 45 is explained. The controller 10 serves as a variety of processing parts besides the screen providing unit 45. For executing the job at the image processing device 1, for example, the controller 10 serves as a job controller to perform a variety of processing in order to drive the scanner section 3, the printer section 4 and/or the fax section 18. As an example, when the image processing device 1 receives the print job over the network, the controller 10 performs RIP (Raster Image Processing) based on the print data included in the print job. As described above, when the controller 10 performs the processing relating to the job, a level of the load placed on the CPU 11 of the controller 10 raises. The screen providing unit 45 then may not able to forward the data element effectively.

The data obtaining unit 42 determines the level of the load on the controller 10 at the time when the number of the data request is designated. If the level of the load is higher than a predetermined level, it is preferable to designate the less number of the data request. As a result, even when the screen providing unit 45 is not enabled to forward the data element effectively, the data obtaining unit 42 may obtain the data element within the time which enables the time required for completion of displaying the list screen G3 to be less than the predetermined period of time Ta.

As described above, the user does not feel something in the operation is off, and the list screen may be displayed rapidly, resulting in extreme improvement in the operability.

Second Preferred Embodiment

The second preferred embodiment of the present invention is explained next. In the second preferred embodiment, when the data obtaining unit 42 designates the number of the data request, a flick rate when the user performs the flick operation is determined and the number of the data request depending on the flick rate of the user is designated.

Figure 11:
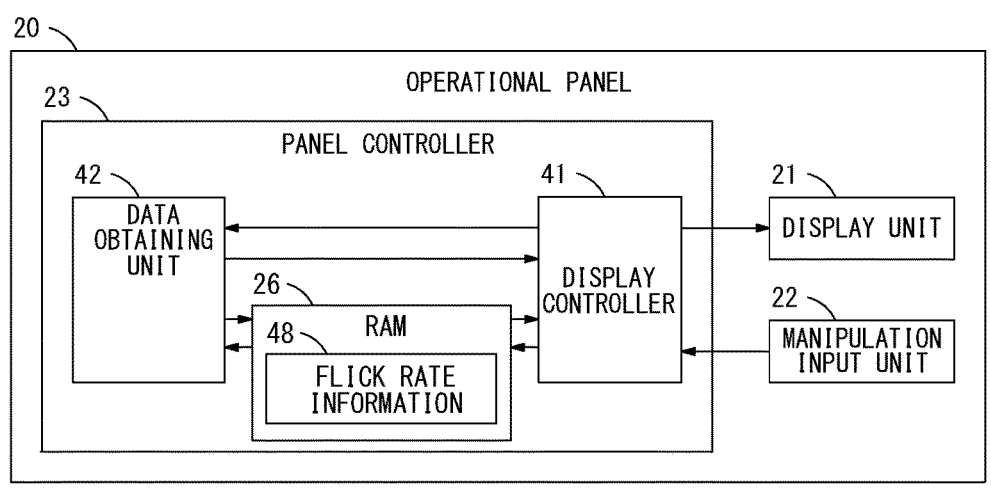
FIG. 11 illustrates an example of a structure of an operational panel of a second preferred embodiment.

FIG. 11 illustrates an example of the structure of the operational panel 20 of the second preferred embodiment. According to the second preferred embodiment, as illustrated in FIG. 11, flick rate information 48 is stored in the RAM 26. More specifically, the display controller 41 detects a moving rate of the touched position by the user to the manipulation input unit 22, and detects the moving rate as the flick rate. The display controller 41 generates the flick rate information 48 and stores it in the RAM 26.

The display controller 41 preferably generates the flick rate information 48 for each user who uses the image processing device 1 and stores in the RAM 26. Once the image processing device 1 enters a state in which the user is logged in, the display controller 41, for instance, identifies the login user, and determines the operation performed to the operational panel 20 is the operation performed by the login user. When the flick operation is performed by the login user, the display controller 41 generates the flick rate information 48 corresponding to the login user, and stores it in the RAM 26. The flick rate information 48 stored in the RAM 26 may be an average value of the flick rate of each user.

When displaying the list screen G3 on the display unit 21 based on the user operation, the display controller 41 receives the screen information D2 and the data element D4 to display on the list screen G3 via the data obtaining unit 42 as well as in the first preferred embodiment.

When obtaining the data element D4 to display on the list screen G3 from the screen providing unit 45, the data obtaining unit 42 reads the flick rate information 48 stored in the RAM 26, and designates the number of times to obtain the data element based on the flick rate of the user who is operating the operational panel 20. When, for example, the flick rate of the user is higher than a predetermined value, the data obtaining unit 42 designates the maximum number of the data request that enables the time required until completion of displaying the list screen G3 to be less than the predetermined time Ta. On the other hand, if the flick rate of the user is lower than the predetermined value, the data obtaining unit 42 designates the less number of the data request than the maximum number of the data request that enables the time required until completion of displaying the list screen G3 to be less than the predetermined time Ta. Hence, when the flick rate of the user is slow, the load on the CPU 24 of the operational panel 20 and the load on the CPU 11 of the controller 10 may be decreased.

Figure 12:
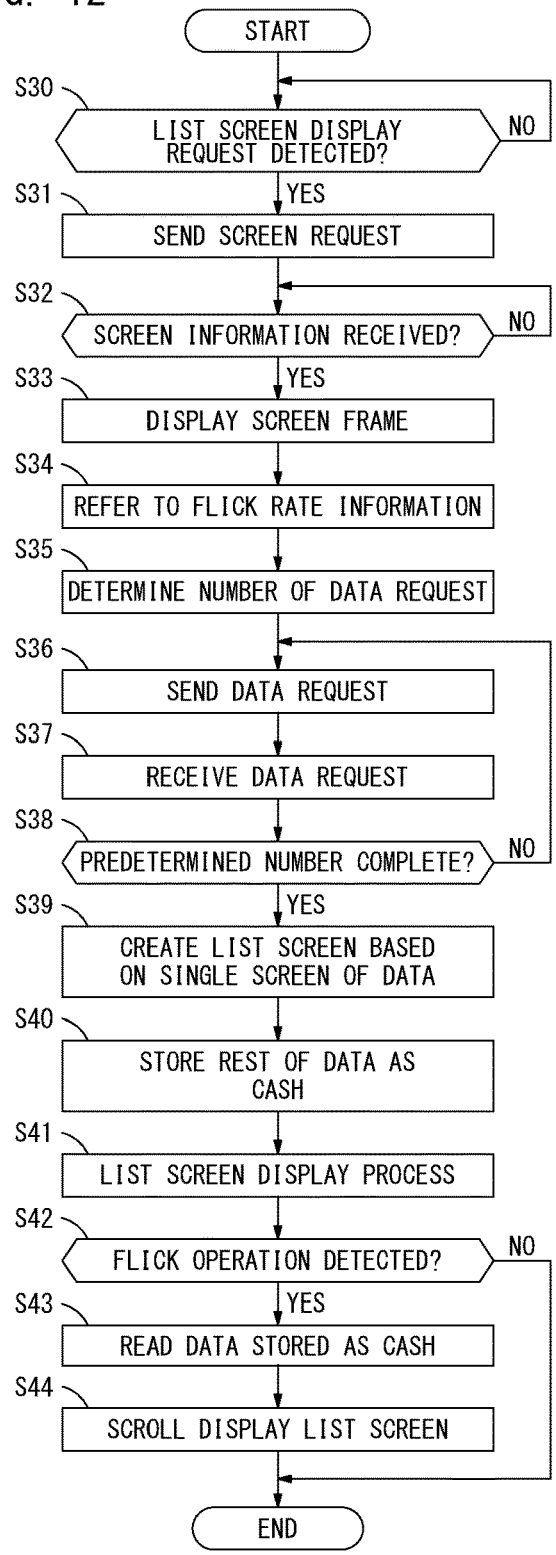
FIG. 12 illustrates a flow diagram explaining an exemplary procedure of a process performed by the panel controller of the second preferred embodiment.

FIG. 12 illustrates a flow diagram explaining an exemplary procedure of a process performed by the panel controller 23 of the second preferred embodiment. The process in steps S30 to S33 and S36 to S44 of FIG. 12 is the same process as the process in the steps S10 to S13 and S16 to S24 of FIG. 9. After displaying the screen frame to display the list screen G3 based on the screen information D2 obtained from the screen providing unit 45 (step S33), the panel controller 23 performs the process in step S34 next.

The panel controller 23 reads the flick rate information 48 stored in the RAM 26, and refers to the flick rate of the user operating the operational panel 20 (step S34). The panel controller 23 designates the number of the data request based on the flick rate of the user (step S35). As described above, for example, when the flick rate of the user is higher than the predetermined value, the data obtaining unit 42 designates the maximum number of the data request that enables the time required until completion of displaying the list screen G3 to be less than the predetermined time Ta. On the other hand, if the flick rate of the user is lower than the predetermined value, the less number of the data request is designated. Even when the flick rate of the user is lower than the predetermined value, it is the same to obtain more number of the data element than the single screen of the list screen G3 of the data element. More specifically, when the flick rate of the user is high, the larger number of the data element D4 is stored in the RAM 26 as cache. When the flick rate of the user is low, the less number of the data element D4 is stored in the RAM 26 as cache.

Once designating the number of the data request as described above, the panel controller 23 performs the process after step S36 to repeatedly perform the process to obtain the data element D4 from the screen providing unit 45.

As described above, according to the second preferred embodiment, if the flick rate of the user is low, the number of the data element D4 obtained from the screen providing unit 45 when the list screen G3 is displayed at first may be less. This may reduce the load on the panel controller 23 and the controller 10. Especially, when the controller 10 performs the process as to the job, the level of the load on the controller 10 raises. If the process load on the screen providing unit 45 is decreased, the data element D4 to display the list screen G3 may be obtained without disturbing the process as to the job.

Everything else except for the above-described points are the same as those explained in the first preferred embodiment as described earlier.

Third Preferred Embodiment

The third preferred embodiment of the present invention is explained next. In the third preferred embodiment, the time required for the data obtaining unit 42 to obtain the data element D4 from the screen providing unit 45 is measured and the data element D4 is obtained within the time that enables the time required until completion of displaying the list screen G3 to be less than the predetermined time Ta based on the measured time.

Figure 13:
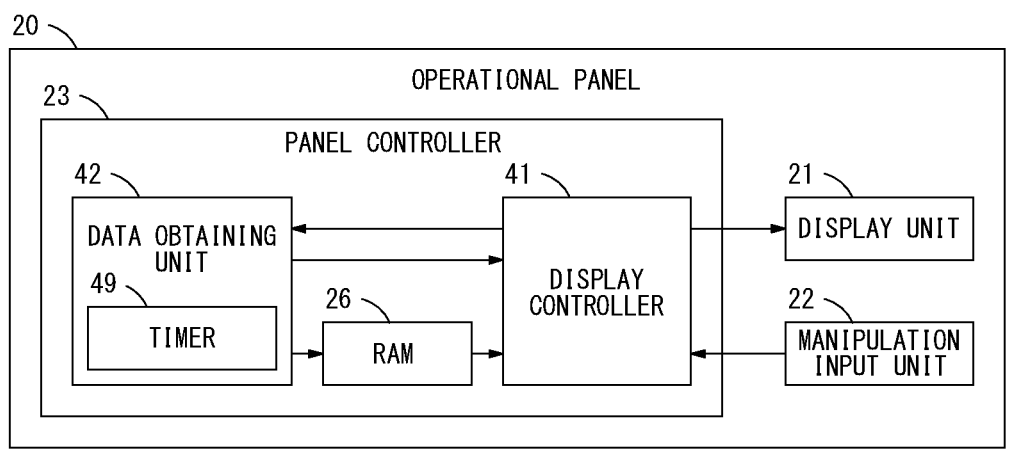
FIG. 13 illustrates an example of the structure of the operational panel of a third preferred embodiment.

FIG. 13 illustrates an example of the structure of the operational panel 20 of the third preferred embodiment. The operational panel 20 of the third preferred embodiment includes the data obtaining unit 42 with a timer 49. The timer 49 starts measuring the time upon the transmission of the data element D3 to the screen providing unit 45 by the data obtaining unit 42, for example. The timer 49 measures the time taken by the single process for the data obtaining unit 42 to obtain the data element D4 from the screen providing unit 45.

The data obtaining unit 42 calculates the time required for the single data element obtaining process based on the time measured by the timer 49 when the data element is repeatedly obtained from the screen providing unit 45. The data obtaining unit 42 then designates the number of the data request that enables the time required until completion of displaying the list screen G3 to be less than the predetermined time Ta based on the calculated time. The detail of the operation in which the third preferred embodiment may be practiced is explained below.

Figure 14:
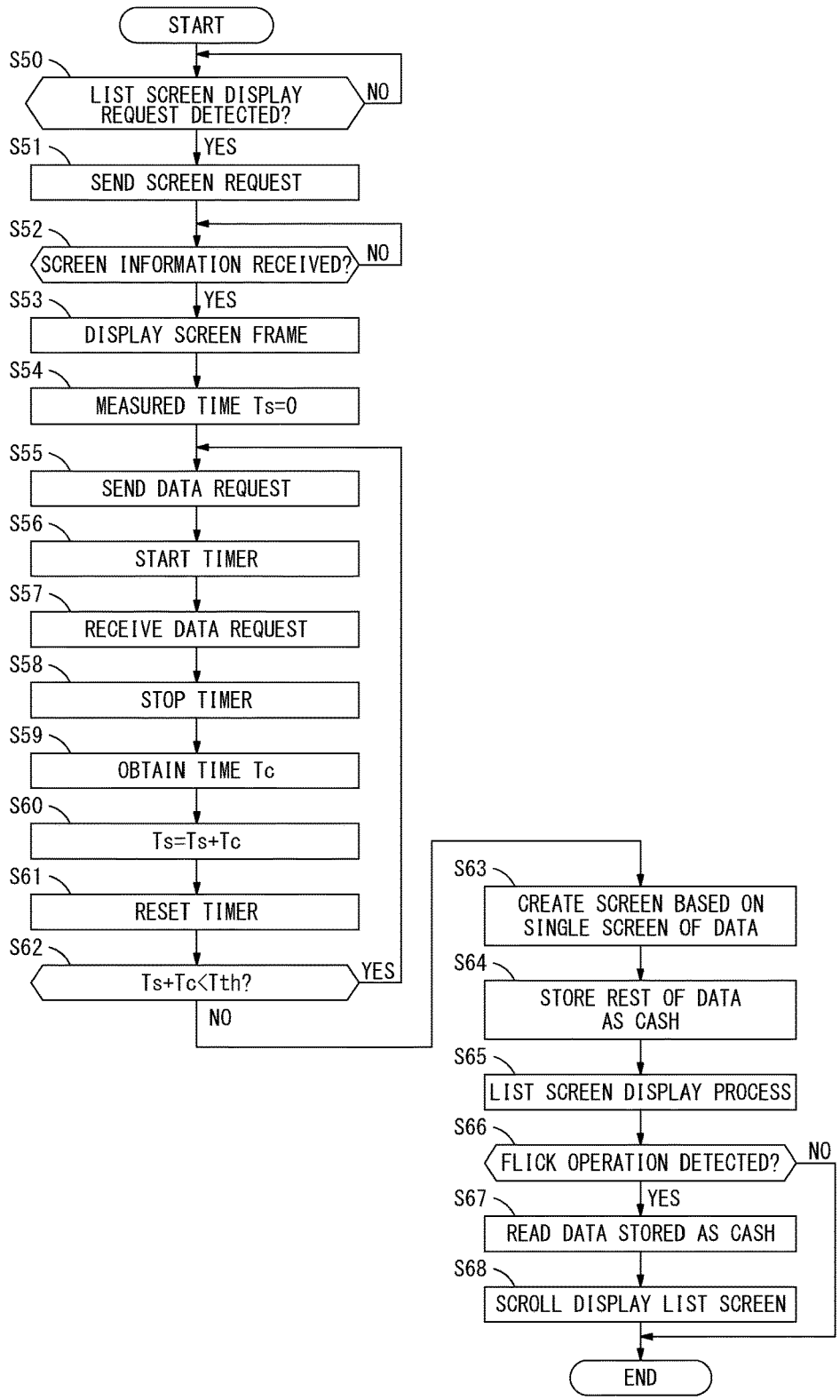
FIG. 14 illustrates a flow diagram explaining an exemplary procedure of a process performed by the panel controller of the third preferred embodiment.

FIG. 14 illustrates a flow diagram explaining an exemplary procedure of a process performed by the panel controller 23 of the third preferred embodiment. The process in steps S50 to S53 and S63 to S68 of FIG. 14 is the same process as the process in the steps S10 to S13 and S16 to S24 of FIG. 9. After displaying the screen frame to display the list screen G3 based on the screen information D2 obtained from the screen providing unit 45 (step S53), the panel controller 23 performs the process in step S54 and after next.

Prior to the transmission of the data request D3 to the screen providing unit 45, the panel controller 23 resets a measured time Ts to 0 (step S54). The panel controller 23 sends the data request D3 to the screen providing unit 45 (step S55), and enables the timer 49 to start measuring the time (step S56). In response to receiving the data element D4 from the screen providing unit 45 (step S57), the panel controller 23 stops the measurement of the time by the timer 49 (step S58), and obtains a measured time Tc by the timer 49 (step S59). The measured time Tc by the timer 49 is added to the measured time Ts so that the measured time Ts is updated (step S60). The panel controller 23 then resets the timer 49 (step S61).

Next, the panel controller 23 predicts that the same time as the time Tc required for the current data obtaining process may be required for the following data obtaining process. The panel controller 23 determines if the following data obtaining process may be complete until the elapse of the time Tth which can be used to obtain the data element D4 (step S62). More specifically, the panel controller 23 determines whether or not the value obtained by adding the time Tc required for the current data obtaining process to the measured time Ts is less than the time Tth. If the following data obtaining process may be complete until the elapse of the time Tth (when a result of step S62 is YES), the panel controller 23 returns to the process in step S55 to repeatedly perform the process to obtain the data element D4 from the screen providing unit 45. If the following data obtaining process may not be complete until the elapse of the time Tth (when a result of step S62 is NO), the panel controller 23 performs the process in step S63 and after to display the list screen G3 on the display unit 21 without performing the following data obtaining process.

Figure 15:
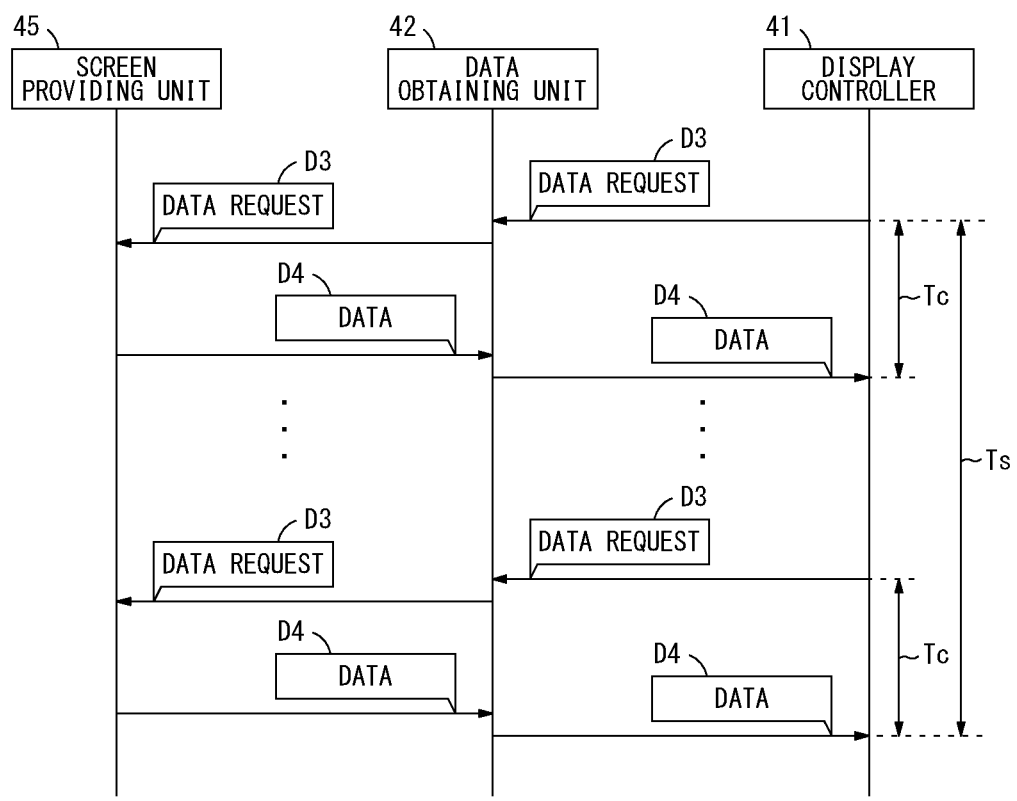
FIG. 15 illustrates a process when the panel controller obtains data in the third preferred embodiment.

FIG. 15 illustrates a process when the panel controller 23 obtains the data element D4 from the screen providing unit 45 in the third preferred embodiment. As illustrated in FIG. 15, after receiving the data request D3 from the display controller 41, the data obtaining unit 42 sends the data request D3 to the screen providing unit 45. The data obtaining unit 42 then activates the timer 49 to start measuring the time Tc required for the data obtaining process. The data obtaining unit 42 receives the data element D4 from the data providing unit 45, and outputs the data element D4 to the display controller 41. The data obtaining unit 42 then stops the timer 49, and adds the time Tc required for the data obtaining process to the measured time Ts. The measured time Ts is the time to which the time Tc is added every time the single data obtaining process is performed by the data obtaining unit 42. The time Tc is the time required for the previous data obtaining processes. Hence, the data obtaining unit 42 determines if the display of the list screen G3 may be complete within the time less than the predetermined period of time Ta if the following data obtaining process is performed based on the measured time Ts. If the display of the list screen G3 may be complete within the time less than the predetermined period of time Ta, the data obtaining unit 42 performs the following data obtaining process. If the display of the list screen G3 may not be complete within the time less than the predetermined period of time Ta, the data obtaining unit 42 does not perform the following data obtaining process.

As described above, in the third preferred embodiment, the data obtaining unit 42 repeatedly obtains the data element D4 with measuring the time Tc actually required for obtaining the data element D4 from the screen providing unit 45. Thus, the display of the list screen G3 may be complete in the time less than the predetermined time Ta without fail.

Everything else except for the above-described points are the same as those explained in the first preferred embodiment or the second preferred embodiment as described earlier.

Fourth Preferred Embodiment

The fourth preferred embodiment of the present invention is explained next. In each of the above-described first to third preferred embodiments, the operational panel 20 of the image processing device 1 serves as the display device 9 of the present invention. In the fourth preferred embodiment, a terminal device 8 capable of establishing wireless or wired communications with the image processing device 1 serves as the display device 9.

Figure 16:
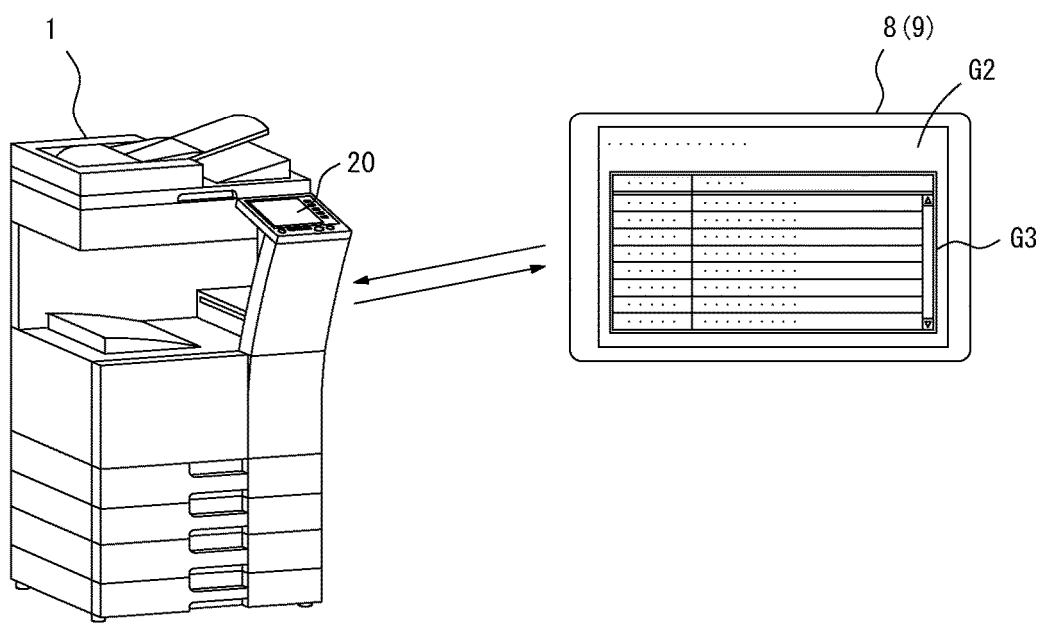
FIG. 16 illustrates an exemplary configuration of the display system including the image processing device and a terminal device.

FIG. 16 illustrates an exemplary configuration of the display system including the image processing device 1 and the terminal device 8. The terminal device 8 is a portable information processing device constructed by a smartphone or a tablet terminal, for example. The terminal device 8 includes the display unit 21, the manipulation input unit 22 and the panel controller 23 as well as in the first to the third preferred embodiments. The terminal device 8 communicates with the image processing device 1 so that it may obtain the same screen as the one displayed on the operational panel 20 of the image processing device 1 from the image processing device 1 and display the obtained screen on the display unit 21.

When the terminal device 8 of the fourth preferred embodiment obtains the list screen G3 from the image processing device 1 in response to the user operation and displays the obtained list screen G3, the terminal device 8 obtains the data element to display on the list screen G3 from the image processing device 1 so that the display of the list screen G3 may be complete within the time less than the predetermined period of time Ta as well as the first to the third preferred embodiments. More specifically, the terminal device 8 obtains the single screen of the list screen G3 of the data element and displays, and also obtains the number of the data element exceeding the single screen of the data element and stores the obtained exceeding data element in the RAM 26 as cache.

Hence, also in the fourth preferred embodiment, the terminal device 8 does not cause the delay in the time until completion of the display of the list screen G3. The terminal device 8 is capable of obtaining in advance the data element to scroll the list screen G3 in preparation for the flick operation performed by the user after the list screen G3 is displayed and storing the obtained data element in the RAM 26.

Fifth Preferred Embodiment

Figure 17:
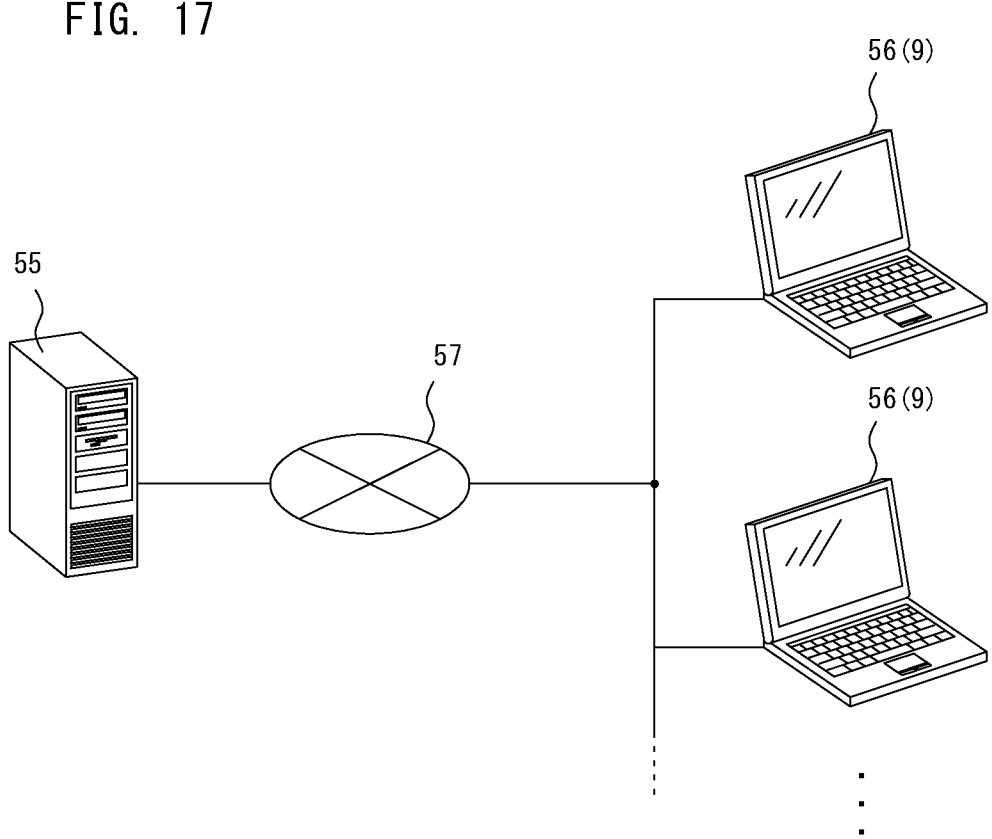
FIG. 17 illustrates an exemplary configuration of a display system including a display device and a server.

The fifth preferred embodiment of the present invention is explained next. FIG. 17 illustrates an exemplary configuration of the display system including the display device 9 in which the fifth preferred embodiment may be practiced. As illustrated in FIG. 17, in the fifth preferred embodiment, an information processing device 56 connected to a server 55 over a network 57 serves as the display device 9. The information processing device 56 is constructed by a general personal computer, for instance. The information processing device 56 includes the display unit 21 and the manipulation input unit 22 as well as in the first to the third preferred embodiments. Also, the information processing device 56 includes a controller which has the same function as the above-described panel controller 23.

The information processing device 56 is capable of accessing the server 55 over the network 57 and obtaining the screen information and the data element to display on the display unit 21 from the server 55. When obtaining the list screen G3 from the server 55 in response to the user operation, the information processing device 56 obtains the single screen of the list screen G3 of the data element from the server 55 in order to complete the display of the list screen G3 within the time less than the predetermined period of time Ta, which is the same as the first to the third preferred embodiments. More specifically, the information processing device 56 obtains the single screen of the list screen G3 of the data element and displays, and also obtains the number of the data element exceeding the single screen of the data element and stores in the RAM 26 as cache.

Hence, also in the fifth preferred embodiment, the information processing device 56 does not cause the delay in the time until completion of the display of the list screen G3. The information processing device 56 is capable of obtaining in advance the data element to scroll the list screen G3 in preparation for the flick operation performed by the user after the list screen G3 is displayed and storing the obtained data element in the RAM 26.

The above-described server 55 may be equipped inside the image processing device 1.

Sixth Preferred Embodiment

Figure 18:
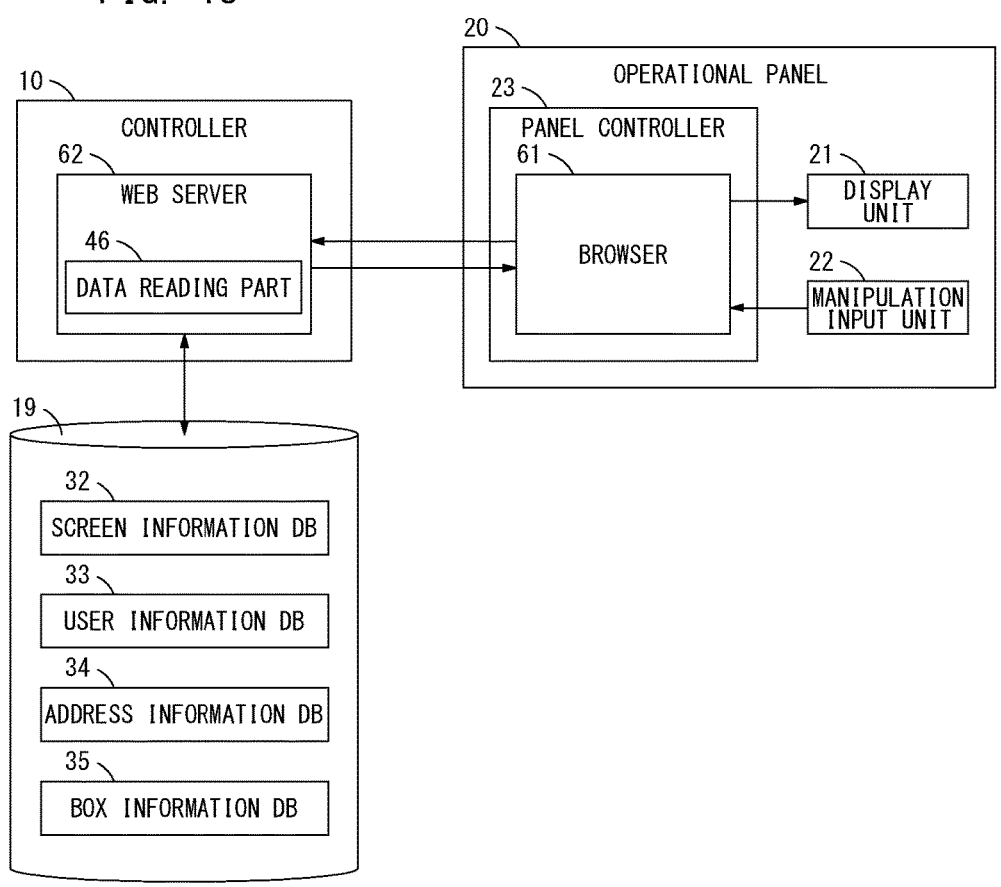
FIG. 18 illustrates a block diagram showing an example of the hardware structure of the display device in which a sixth preferred embodiment may be practiced.

The sixth preferred embodiment of the present invention is explained next. FIG. 18 illustrates a block diagram showing an example of the hardware structure of the display device 9 in which the sixth preferred embodiment may be practiced. In the six preferred embodiment, the operational panel 20 provided with the image processing device 1 serves as the display device 9 as well as in the first to the third preferred embodiments.

As illustrated in FIG. 18, the controller 10 of the image processing device 1 serves as a web server 62. The panel controller 23 of the operational panel 20 serves as a browser 61. The browser 61 accesses the web server 62 of the controller 10, and obtains the screen information to display on the display unit 21 and/or the data element D4 to display on the list screen G3 from the web server 62. The browser 61 then displays the obtained information or the data element on the display unit 21. More specifically, in the sixth preferred embodiment, the browser 61 serves as the display controller 41 and the data obtaining unit 42 as described above.

When obtaining the list screen G3 from the web server 62 in response to the user operation and displaying the obtained list screen G3, the browser 61 obtains the data element to display the list screen G3 from the web server G3 so that the display of the list screen G3 may be complete within the time less than the predetermined period of time Ta as well as the first to the third preferred embodiments. More specifically, the browser 61 obtains the single screen of the list screen G3 of the data element from the web server 62 and displays, and also obtains the number of the data element exceeding the single screen of the data element from the server 62 and stores the exceeding number of the data element in the RAM 26 as cache.

Hence, also in the sixth preferred embodiment, the browser 61 does not cause the delay in the time until completion of the display of the list screen G3. The browser 61 is capable of obtaining in advance the data element to scroll the list screen G3 in preparation for the flick operation performed by the user after the list screen G3 is displayed and storing the obtained data element in the RAM 26.

In the above descriptions, the operational panel 20 of the image processing device 1 is provided with the browser 61. However, this is given not for limitation. More specifically, a device such as the information processing device like the general personal computer may be provided with the browser 61. Alternatively, the terminal device such as the smartphone or the tablet terminal may be provided with the browser 61.

Although the embodiment of the present invention has been described and illustrated in detail, it is clearly understood that the same is by way of illustration and example only and not limitation, the scope of the present invention should be interpreted by terms of the appended claims.

MODIFICATIONS

While the preferred embodiments of the present invention have been described above, the present invention is not limited to the preferred embodiments. Various modifications may be applied to the present invention.

In the above-described preferred embodiments, for example, the single screen of the list screen G3 includes 8 data elements, and the data elements may be displayed in the list form. The number of the data element that may be displayed on the list screen G3 does not have to be the number explained in each preferred embodiment.

In the above-described preferred embodiments, the information such as the address information, the user information and the box information is displayed in the list form. However, this is given not for limitation. The data element displayed in the list form on the list screen G3 may be any type of the data element.

What is claimed is:

1. A display device, comprises:
   a manipulation input part configured to receive user operation;
   a display part on which a list screen showing a plurality of data elements in a list form is displayed; and
   a hardware processor that:
   obtains the data element to display on said list screen; and
   creates said list screen based on the obtained data element and displays on said display part, wherein
   said hardware processor obtains a number of the data element that is more than a number that can be displayed on said list screen and that enables a time required until completion of displaying said list screen to be less than a predetermined period of time and outputs the number of the data element that can be displayed on said list screen, and stores the data element exceeding the number that can be displayed on said list screen as cache when said list screen is displayed on said display part in response to the user operation received by said manipulation input part,
   said hardware processor further measures a time from start of a data obtaining process to display said list screen, and
   designates the number of the data element to obtain when said list screen is to be displayed based on the measured elapsed time.

2. The display device according to claim 1, wherein said hardware processor obtains the data element stored as cache and updates said list screen when the operation to scroll said list screen by the user is detected as said list screen is being displayed on said display part.

3. The display device according to claim 1, wherein said hardware processor repeatedly performs the process to obtain the data element in a unit of predetermined data element,
measures the time required for obtaining the data element in the single unit of predetermined data element, and
calculates the time required for the single data element obtaining process based on the measured time when the data element is repeatedly obtained in the unit of predetermined data element, and designates the number of the data element obtaining process to be performed which enables the time required until completion of displaying said list screen to be less than the predetermined period of time based on the calculated time.

4. The display device according to claim 1, wherein said hardware processor selects a group of data elements to display on said list screen from among multiple groups of data elements, each includes a different number of items, and increases or decreases the number of data element to obtain when said list screen is displayed on said display part in accordance with the number of the items included in the selected data group.

5. The display device according to claim 4, wherein said hardware processor decreases the number of the data element to obtain when the number of the items included in said selected data group is relatively large, and increases the number of the data element to obtain when the number of the items included in said selected data group is relatively small.

6. The display device according to claim 1, wherein said hardware processor repeatedly obtains a less number of the data elements than the number that can be displayed on said list screen when said list screen displayed on said display part is updated based on the flick operation by the user as said list screen is displayed on said display part.

7. The display device according to claim 1, wherein said hardware processor obtains the same number of the data elements as the number that can be displayed on said list screen when said list screen displayed on said display part is updated in response to the operation by the user to display a next page as said list screen is displayed on said display part.

8. An image processing device, comprising a display device according to claim 1.

9. A display system, comprising:
   a display device according to claim 1; and
   a server that provides said display device with a data element to display a list screen in response to a request from said display device.

10. A display device, comprises:
    a manipulation input part configured to receive user operation;
    a display part on which a list screen showing a plurality of data elements in a list form is displayed;
    a hardware processor that:
    obtains the data element to display on said list screen; and
    creates said list screen based on the obtained data element and displays on said display part, wherein
    said hardware processor obtains a number of the data element that is more than a number that can be displayed on said list screen and that enables a time required until completion of displaying said list screen to be less than a predetermined period of time and outputs the number of the data element that can be displayed on said list screen, and stores the data element exceeding the number that can be displayed on said list screen as cache when said list screen is displayed on said display part in response to the user operation received by said manipulation input part; and a storage that measures a rate of a flick operation performed by the user to said manipulation input part as said list screen is displayed on said display part, wherein said hardware processor increases the number of the data element to obtain when the flick operation rate of the user is higher than a predetermined value and decreases the number of the data element to obtain when the flick operation rate of the user is lower than the predetermined value based on the information relating to the rate stored in said storage as said list screen is displayed on said display part.

11. A non-transitory recording medium storing a computer readable program to be executed by a hardware processor in a display device that includes a manipulation input part configured to receive user operation, and a display part on which a list screen showing a plurality of data elements in a list form is displayed, execution of the computer readable program by said hardware processor in said display device causing said hardware processor to perform:

obtains the data element to display on said list screen; and creates said list screen based on the obtained data element and displays on said display part, wherein a number of the data element that is more than a number that can be displayed on said list screen and that enables a time required until completion of displaying said list screen to be less than a predetermined period of time is obtained and the number of the data element that can be displayed on said list screen is output, and the data element exceeding the number that can be displayed on said list screen is stored as cache when said list screen is displayed on said display part in response to the user operation received by said manipulation input part, execution of the computer readable program by said hardware processor causing said hardware processor in said display device to further perform:

measures a time from start of a data element obtaining process to display said list screen, wherein the number of the data element to be obtained when said list screen is to be displayed is designated based on the measured elapsed time.

12. The non-transitory recording medium according to claim 11, wherein the data stored as cache is obtained and said list screen is updated when the operation to scroll said list screen by the user is detected as said list screen is being displayed on said display part.

13. The non-transitory recording medium according to claim 11, wherein the process to obtain the data element in a unit of predetermined data element is repeatedly performed, the time required for obtaining the data element in the single unit of predetermined data element is measured, and the time required for the single data element obtaining process is calculated based on the measured time when the data element is repeatedly obtained in the unit of predetermined data element, and the number of the data element obtaining process to be performed which enables the time required until completion of displaying said list screen to be less than the predetermined period of time is designated based on the calculated time.

14. The non-transitory recording medium according to claim 11, wherein a group of the data elements to be displayed on said list screen is selected from among multiple groups of the data elements, each includes a different number of items, and the number of the data element to be obtained is increased or decreased when said list screen is displayed on said display part in accordance with the number of the items included in the selected data group.

15. The non-transitory recording medium according to claim 14, wherein the number of the data element to be obtained is decreased when the number of the items included in said selected data group is relatively large, and the number of the data element to be obtained is increased when the number of the items included in said selected data group is relatively small.

16. The non-transitory recording medium according to claim 14, wherein a less number of the data elements than the number that can be displayed on said list screen is repeatedly obtained when said list screen displayed on said display part is updated based on the flick operation by the user as said list screen is displayed on said display part.

17. The non-transitory recording medium according to claim 14, wherein the same number of the data elements as the number that can be displayed on said list screen is obtained when said list screen displayed on said display part is updated based on the operation by the user to display a next page as said list screen is displayed on said display part.

18. A non-transitory recording medium storing a computer readable program to be executed by a hardware processor in a display device that includes a manipulation input part configured to receive user operation, and a display part on which a list screen showing a plurality of data elements in a list form is displayed, execution of the computer readable program by said hardware processor in said display device causing said hardware processor to perform:

obtains the data element to display on said list screen; and creates said list screen based on the obtained data element and displays on said display part, wherein a number of the data element that is more than a number that can be displayed on said list screen and that enables a time required until completion of displaying said list screen to be less than a predetermined period of time is obtained and the number of the data element that can be displayed on said list screen is output, and the data element exceeding the number that can be displayed on said list screen is stored as cache when said list screen is displayed on said display part in response to the user operation received by said manipulation input part, execution of the computer readable program by said hardware processor causing said hardware processor in said display device to further perform:

measures a rate of a flick operation performed by the user to said manipulation input part as said list screen is displayed on said display part and stores in a predetermined storage, wherein the number of the data element to be obtained is increased when the flick operation rate of the user is higher than a predetermined value and the number of the data element to be obtained is decreased when the flick operation rate of the user is lower than the predetermined value based on the information relating to the rate stored in said storage as said list screen is displayed on said display part.

* * * * *